(12) United States Patent
Lin et al.

(10) Patent No.: US 8,681,756 B2
(45) Date of Patent: Mar. 25, 2014

(54) ANCHOR GATEWAY, COMMUNICATION METHOD AND NON-TRANSITORY MACHINE-READABLE MEDIUM THEREOF

(75) Inventors: Yu-Hsiang Lin, Kuei-Shan Hsiang (TW); Po-Wen Chi, Taipei (TW); Ching-Lun Lin, Zhongli (TW); Wei-Chih Lin, Keelung (TW); Rong-Hong Jan, Hsinchu (TW)

(73) Assignee: Institute for Information Industry, Taipei (TW)

( * ) Notice: Subject to any disclaimer, the term of this patent is extended or adjusted under 35 U.S.C. 154(b) by 1116 days.

(21) Appl. No.: 12/630,990

(22) Filed: Dec. 4, 2009

(65) Prior Publication Data

US 2011/0128945 A1 Jun. 2, 2011

(30) Foreign Application Priority Data

Dec. 1, 2009 (TW) ................................ 98140951 A (51) Int. Cl.
*H04W 4/00* (2009.01)
*H04B 7/00* (2006.01)

(52) U.S. Cl.
USPC .......................... 370/338; 370/310; 370/328

(58) Field of Classification Search
USPC ........................................................ 370/338
See application file for complete search history.

(56) References Cited

U.S. PATENT DOCUMENTS

2009/0080374 A1* 3/2009 Lee et al. ...................... 370/328
2010/0304737 A1* 12/2010 Jain et al. ................... 455/426.1

* cited by examiner

*Primary Examiner* — Shripal Khajuria
(74) *Attorney, Agent, or Firm* — Skaar Ulbrich Macari, P.A.

(57) ABSTRACT

An anchor gateway, a communication method and a tangible machine-readable medium are provided. The anchor gateway is for use in a WiMAX network comprising an authentication gateway and a serving base station (BS). After a mobile station (MS) enters the WiMAX network, the anchor gateway will request the authentication gateway and the serving BS according to an identification of the MS to respectively provide authentication key context and medium access control context. Thereby, the network latency, which is made by the MS in handover, will be reduced effectively.

15 Claims, 5 Drawing Sheets

ANCHOR GATEWAY, COMMUNICATION METHOD AND NON-TRANSITORY MACHINE-READABLE MEDIUM THEREOF

PRIORITY

This application claims priority to Taiwan Patent Application No. 098140951 filed on Dec. 1, 2009, the disclosure of which is incorporated by reference herein in its entirety.

FIELD

The present invention relates to an anchor gateway, a communication method and a tangible machine-readable medium thereof. Specifically, the present invention relates to an anchor gateway, a communication method and a tangible machine-readable medium thereof capable of reducing the handover latency.

BACKGROUND

With continuous advancement in science and technology, people are imposing ever higher requirements on communications. Nowadays, more and more importance is being attached to convenience of communications in addition to requirements on quality of communications. Among various communication means, wireless communications are advantageous in that they provide higher mobility by obviating the need of physical communication network wiring. Therefore, mobile products (i.e., mobile stations (MSs)) with wireless communication functionality such as cell phones, notebook computers and the like are getting more and more popularity in recent years and have become the mainstream products in the consumer electronics market.

However, in practical use, MSs operating in different locations have to be handed over among individual base stations (BSs) frequently in order to ensure a certain level of wireless communication quality. Taking a WiMAX network as an example, it features an ability to support mobile data access and, accordingly, defines two handover modes, namely, the fully controlled handover and the uncontrolled handover. Hereinbelow, operating principles of the two handover modes will be described in brief.

The fully controlled handover is characterized in that, prior to a handover process, an MS transmits, in advance, a handover request to a serving BS that currently provides network services and then, also in advance, the serving BS transmits data related to the MS to a target BS. The target BS also establishes a connection path in advance for use by the MS to transmit data after being handed over to the target BS. Upon completion of these operations, the serving BS informs the MS that the handover process may commence now. Then, the MS may be handed over to the target BS immediately and continue to use the services it previously used prior to the handover.

On the other hand, the uncontrolled handover mode is characterized in that, instead of transmitting a handover request to the serving BS in advance, the MS transmits the handover request directly to the target BS. In this case, the target BS must acquire data related to the MS from the serving BS and establish a connection for the MS before the MS can use services of the target BS.

As can found through comparison between the two handover modes, the fully controlled handover leads to less handover latency because information necessary for the handover is transmitted and a connection for use by the MS is established both in advance. Unfortunately, in practical applications, signals in the WiMAX network are often unstable due to various interference factors. Under such conditions, the handover process is more frequently accomplished in the uncontrolled handover mode instead of the fully controlled handover mode. This leads to considerable network latency in the handover process.

Accordingly, an need still exists in the art to provide a solution that can effectively reduce burden of the network associated with handover-related control information during an uncontrolled handover process, so as to improve the handover efficiency and performance of the network as a whole.

SUMMARY OF THE INVENTION

An objective of certain embodiments of the present invention is to provide an anchor gateway for a WiMAX network. The WiMAX network comprises an authentication gateway, a serving gateway and a serving base station (BS). The serving BS is configured to proceed a first data path (DP) registration procedure with the anchor gateway via the serving gateway and transmit a DP registration signal, comprising an identification (ID) code of a mobile station (MS), of the MS corresponding to the first DP registration procedure. The anchor gateway comprises a transceiver interface and a microprocessor. The microprocessor is electrically connected to the transceiver interface, and the transceiver interface is configured to receive the DP registration signal.

The microprocessor is configured to transmit an authentication key context request signal comprising the ID code of the MS to the authentication gateway via the transceiver interface according to the DP registration signal, and to transmit a medium access control (MAC) context request signal comprising the ID code of the MS to the serving BS according to the DP registration signal. The authentication gateway is configured to transmit a list of authentication key contexts according to the ID code of the MS. The serving BS is configured to transmit an MAC context according to the ID code of the MS. The transceiver interface is further configured to receive the authentication key context and the MAC context.

Another objective of certain embodiments of the present invention is to provide a communication method for use in the anchor gateway described above. The anchor gateway is for use in a WiMAX network. The WiMAX network comprises an authentication gateway, a serving gateway and a serving BS. The serving BS is configured to proceed a first data path (DP) registration procedure with the anchor gateway via the serving gateway and transmit a DP registration signal, comprising an identification (ID) code of a mobile station (MS), of the MS corresponding to the first DP registration procedure. The anchor gateway comprises a transceiver interface and a microprocessor. The microprocessor is electrically connected to the transceiver interface.

The communication method according to one example embodiment comprises the steps of: enabling the transceiver interface to receive the DP registration signal; enabling the microprocessor to transmit an authentication key context request signal comprising the ID code of the MS to the authentication gateway via the transceiver interface according to the DP registration signal; enabling the microprocessor to transmit an MAC context request signal comprising the ID code of the MS to the serving BS via the transceiver interface according to the DP registration signal; and enabling the transceiver interface to receive a list of authentication key contexts from the authentication gateway and MAC context from the serving BS after transmitting the authentication key context request signal and the MAC context request signal.

Yet a further objective of certain embodiments of the present invention is to provide a tangible machine-readable medium, which stores a program of a communication method for use in an anchor gateway. The anchor gateway is for use in a WiMAX network. The WiMAX network comprises an authentication gateway and a serving BS. The serving BS is configured to proceed a first data path (DP) registration procedure with the anchor gateway via the serving gateway and transmit a DP registration signal, comprising an identification (ID) code of a mobile station (MS), of the MS corresponding to the first DP registration procedure. The anchor gateway comprises a transceiver interface and a microprocessor. The microprocessor is electrically connected to the transceiver interface.

When being loaded into the anchor gateway, the program executes: a code A for enabling the transceiver interface to receive the DP registration signal; a code B for enabling the microprocessor to transmit an authentication key context request signal comprising the ID code of the MS to the authentication gateway via the transceiver interface according to the DP registration signal; a code C for enabling the microprocessor to transmit an MAC context request signal comprising the ID code of the MS to the serving BS via the transceiver interface according to the DP registration signal; and a code D for enabling the transceiver interface to, receive a list of authentication key contexts from the authentication gateway and MAC context from the serving BS after transmitting the authentication key context request signal and the MAC context request signal.

Accordingly, the anchor gateway of certain embodiments of the present invention is able to, according to the ID code of the MS, request the authentication gateway and the serving BS to respectively provide authentication key context and MAC context. Then, when the MS transmits a handover request to the target BS, the target BS may acquire the authentication key context and the MAC context from the anchor gateway in one go, thereby reducing the handover latency. Thereby, the drawback of the prior art is addressed.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DESCRIPTION OF THE PREFERRED EMBODIMENT

In the following description, the present invention will be explained with reference to example embodiments thereof. However, these embodiments are not intended to limit the present invention to any specific environment, applications or particular implementations described in these embodiments. Therefore, description of these example embodiments is only for purpose of illustration rather than limiting the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
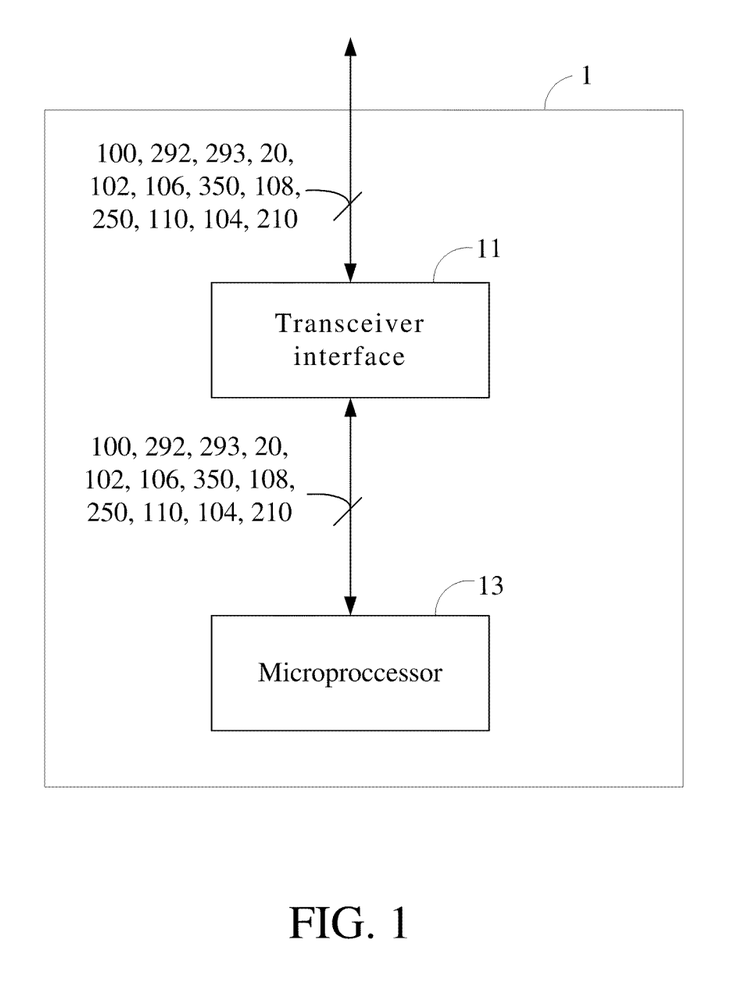
FIG. 1 is a schematic view of a first embodiment of the present invention.
Figure 2:
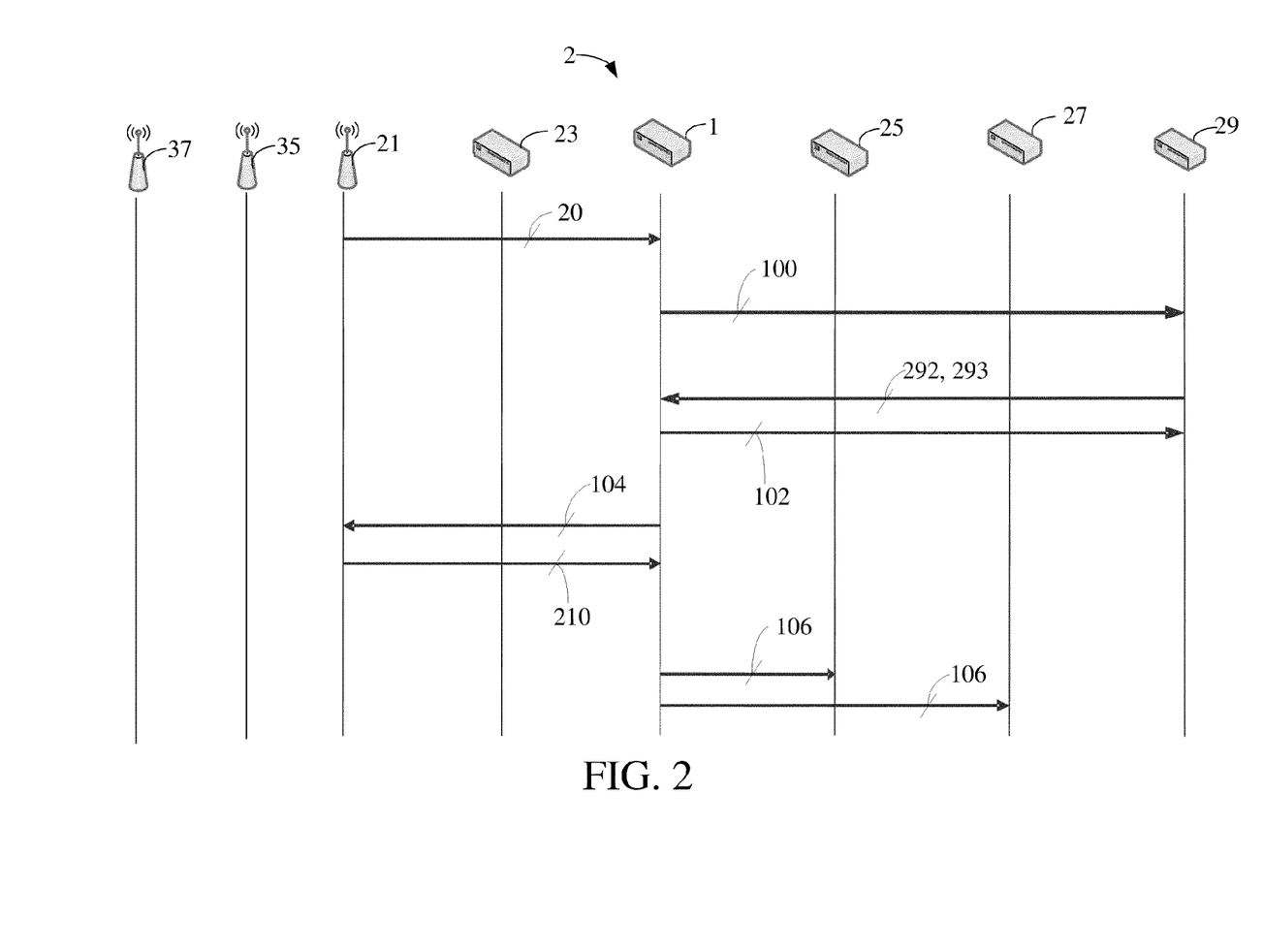
FIG. 2 is a schematic view of a WiMAX network of the first embodiment.

A first example embodiment of the present invention is shown in FIG. 1, which is a schematic view of an anchor gateway 1. The anchor gateway 1 comprises a transceiver interface 11 and a microprocessor 13 electrically connected to the transceiver interface 11. The anchor gateway 1 is adapted for use in a WiMAX network 2 as shown in FIG. 2. In addition to the anchor gateway 1, the WiMAX network 2 further comprises a serving BS 21, a serving gateway 23, candidate gateways 25, 27, an authentication gateway 29 and candidate BSs 35, 37. It shall be noted that, the candidate BS 35 or the candidate BS 37 is a target to which a mobile station (MS) may attempt to handover, and connected to the authentication gateway 29 and the anchor gateway 1 via the candidate gateways 25 and the candidate gateways 27 respectively. In addition, the anchor gateway 1, the serving gateway 23, the candidate gateways 25, 27 and the authentication gateway 29 may all be access service network gateways in practical applications; and the names of the individual gateways depend on roles they play in the WiMAX, and this has no limitation on the present invention. Hereinbelow, the role and functions of the anchor gateway 1 will be described.

Initially, the MS may enter the WiMAX network 2 through the serving BS 21. A first data path (DP) registration procedure is performed between the serving BS 21 and the anchor gateway 1 via the serving gateway 23 to allow the MS to enter the WiMAX network 2 to complete the whole first data path registration procedure. It shall be appreciated that, the first data path registration procedure performed among the serving BS 21, the serving gateway 23 and the anchor gateway 1 may be accomplished by conventional technologies and, thus, will not be further described herein.

When performing the first DP registration procedure with the anchor gateway 1 via the serving gateway 23, the serving BS 21 may transmit a DP registration signal 20 comprising an identification (ID) code of the MS. The transceiver interface 11 of the anchor gateway 1 is configured to receive the DP registration signal 20. Thus, the anchor gateway 1 learns the ID code of the MS from the DP registration signal 20. From description in the above paragraph, the MS may handover to the candidate BS 35 or the candidate BS 37, to obtain authentication key context 292 and authentication key context 293 related to the MS, the candidate BS 35 and the candidate BS 37, the microprocessor 13 of the anchor gateway 1 transmits an authentication key context request signal 100 comprising the ID code of the MS to the authentication gateway 29 via the transceiver interface 11 according to the DP registration signal 20.

After receiving the authentication key context request signal 100, the authentication gateway 29 will find out the candidate BS 35 and the candidate BS 37 around the serving BS 21. The authentication gateway 29 generates the authentication key context 292 (corresponding to the candidate BS 35) and the authentication key context 293 (corresponding to the candidate BS 37), relative to the MS, according to the IDs of the candidate BS 35 and the candidate BS 37. Then, the authentication gateway 29 transmits the authentication key context 292 and the authentication key context 293 to the anchor gateway 1. The transceiver interface 11 of the anchor gateway 1 will receive the authentication key context 292 and the authentication key context 293. Thus, the anchor gateway 1 obtained the authentication key context 292 and the authentication key context 293 relative to the MS.

On the other hand, in order to obtain MAC context 210 related to the MS, the microprocessor 13 of the anchor gateway 1 transmits an MAC context request signal 104 comprising the ID code of the MS to the serving BS 21 via the transceiver interface 11 according to the DP registration signal 20. After receiving the MAC context request signal 104, the serving BS 21 retrieves the MAC context 210 related to the MS according to the ID code of the MS, and transmits the MAC context 210 to the anchor gateway 1 so that the MAC context 210 will be received by the transceiver interface 11 of the anchor gateway 1. Thus, the MAC context 210 related to the MS is obtained by the anchor gateway 1.

After obtaining the MAC context 210, the authentication key context 292 and the authentication key context 293, the microprocessor 13 of the anchor gateway 1 transmits a context ready signal 106 comprising the ID code of the MS to the candidate gateway 25 and the candidate gateway 27 via the transceiver interface 11 so that, when the MS is to be handed over to the candidate BS 35 connected to the candidate gateway 25, the candidate gateway 25 can retrieve the authentication key context 292 and the MAC context 210 from the anchor gateway 1 according to the context ready signal 106. Similarly, when the MS is to be handed over to the candidate BS 37 connected to the candidate gateway 27, the candidate gateway 27 can retrieve the authentication key context 293 and the MAC context 210 from the anchor gateway 1 according to the context ready signal 106.

More specifically, each of the candidate gateway 25 and the candidate gateway 27 may be connected to a plurality of target BSs respectively. If the MS is to be handed over to one of the target BSs (i.e. candidate BS 35) of the candidate gateway 25 from a previous BS, the candidate gateway 25 will consider this handover behavior as a handover to the candidate gateway 25. Further, after receiving the context ready signal 106, the candidate gateway 25 will learn that both the authentication key context 292 and the MAX context 210 have been ready in the anchor gateway 1, so it will obtain the authentication key context 292 and the MAX context 210 simultaneously from the anchor gateway 1 to complete the subsequent handover procedure. In this way, the candidate gateway 25 no longer needs to, after learning that the MS is to be handed over, request the MAC context 210 of the MS from the previous BS and request the authentication key context 292 from the authentication gateway 29 respectively as in the prior art, which would otherwise lead to handover latency.

Figure 3:
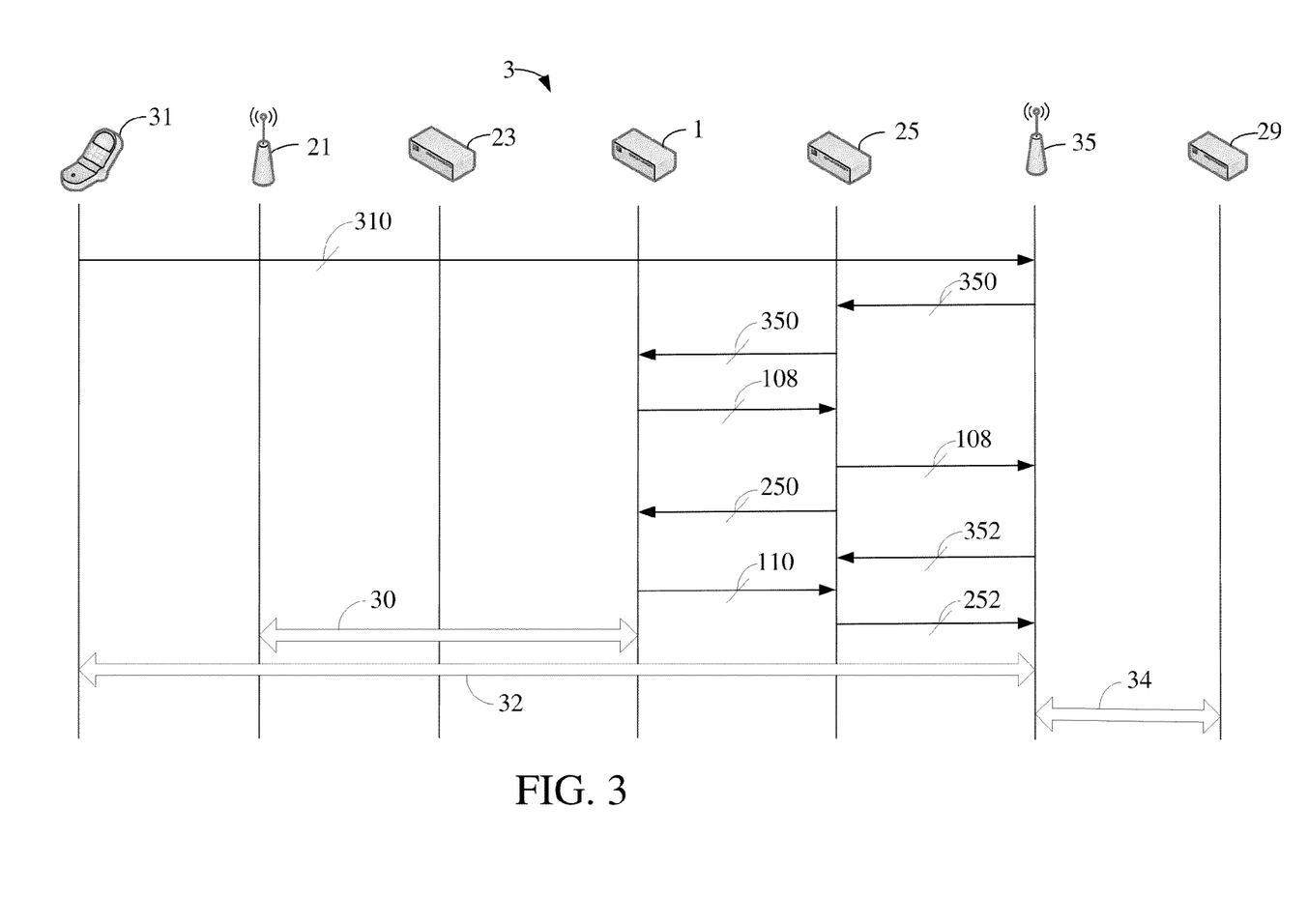
FIG. 3 is a schematic view of another WiMAX network of the first embodiment.

To highlight certain technical features of certain embodiments of the present invention, reference may be made to FIG. 3, which is a schematic view of a WiMAX network 3. As can be seen from FIG. 3, the WiMAX network 3 comprises an MS (e.g., a cell phone) 31, a serving BS 21, a serving gateway 23, an anchor gateway 1, a candidate gateway 25, candidate BS 35 of the candidate gateway 25 and an authentication gateway 29. Currently, the MS 31 has entered the WiMAX network 3, and is being served by the serving BS 21. The serving BS 21 is adapted to interact with the anchor gateway 1 via the serving gateway 23. It shall be noted that, in other embodiments, the serving gateway 23 and the anchor gateway 1 may also be integrated into an integrated gateway having both anchoring and serving functions so that the serving BS 21 can interact with the integrated gateway directly; this will be readily appreciated by those of ordinary skill in the art and, thus, will not be further described herein.

On the other hand, the MS 31 has entered the WiMAX network 3, the anchor gateway 1 has obtained the MAC context related to the MS 31 and the authentication key context related to the candidate BS 35. The anchor gateway 1 also informed the candidate gateway 25 that the MAC context related to the MS 31 and the authentication key context related to the candidate BS 35 have been obtained.

Hence, when the MS 31 is to be handed over to the candidate BS 35 which may be viewed as a target BS herein, it will transmit a handover request signal 310 to the target BS 35. In order to complete the handover procedure, the MAC context and the authentication key context related to the MS 31 will be need by the target BS 35, so the target BS 35 transmits a context request signal 350 comprising the IDs of the target BS 35 and the MS 31 to the candidate gateway 25 which may be viewed as a target gateway herein. After receiving the context request signal 350, the target gateway 25 will decide to transmit the context request signal 350 to the anchor gateway 1 or the serving gateway 23 based on whether to receive the context ready signal 106 of the anchor gateway 1. In this embodiment, the target gateway 25 has received the context ready signal 106 and transmits the context request signal 350 to the anchor gateway 1.

Upon the transceiver interface 11 of the anchor gateway 1 receiving the context request signal 350, the microprocessor 13 of the anchor gateway 1 determines that itself is the anchor gateway of the MS 31 according to the ID of MS in the context request signal 350. Hence, the microprocessor 13 of the anchor gateway 1 will not transmit the context response signal but perform a second DP registration and context transmission integration procedure with the target gateway 25. The target gateway 25 may complete the second DP registration procedure and obtain the MAC context and the authentication key context related to the MS 31.

In more detail, upon the transceiver interface 11 of the anchor gateway 1 receiving the context request signal 350, the microprocessor 13 of the anchor gateway 1 retrieves the corresponding authentication key context from the context request signal 350 according to the IDs of the target BS 35 and the MS 31, and transmits a data path request signal 108 comprising the ID of the MS 31, the MAC context and the authentication key context related to the MS 31 to the target gateway 25 via the transceiver interface 11. After receiving the data path request signal 108, the target gateway 25 will return a data path response signal 250 to the anchor gateway 1 to inform the anchor gateway 1 that the data path request signal 108 has been received.

Upon the transceiver interface 11 of the anchor gateway 1 receiving the data path response signal 250, the microprocessor of the anchor gateway 1 will transmit, via the transceiver interface 11, a data path ACK signal 110 to the target gateway 25 according to the data path response signal 250 to complete the data path registration procedure between the anchor gateway 1 and the target gateway 25.

On the other hand, after receiving the data path request signal 108, the target gateway 25 also transmits the data path request signal 108 to the target BS 37 so that the MAC context and the authentication key context related to the MS 31 can be obtained by the target BS 37 for use in the subsequent handover procedure, so as to complete the DP registration procedure. The target BS 35, after receiving the data path request signal 108, returns a data path response signal 352 to the target gateway 25 to inform the target gateway 25 that the data path request signal 108 has been received. After receiving the data path response signal 352, the target gateway 25 also returns a data path ACK signal 252 to the target BS 35 so that a message exchange may be accomplished between the candidate gateway 25 and the target BS 35.

After the authentication key context and the MAC context related to the MS 31 are obtained by the target BS 35, the anchor gateway 1 performs a data path de-registration procedure 30 with the serving BS 21 via the serving gateway 23. Furthermore, the target BS 35 performs a network re-entry completion procedure 32 with the MS 31 according to the authentication key context and the MAC context, and performs an MAC updating procedure 34 with the authentication gateway 29 to inform the authentication gateway 29 that the MS 31 will be served by the target BS 35. The data path de-registration procedure 30, the network re-entry completion procedure 32 and the MAC updating procedure 34 will be readily appreciated by those of ordinary skill in the art and, thus, will not be further described herein.

Figure 4A:
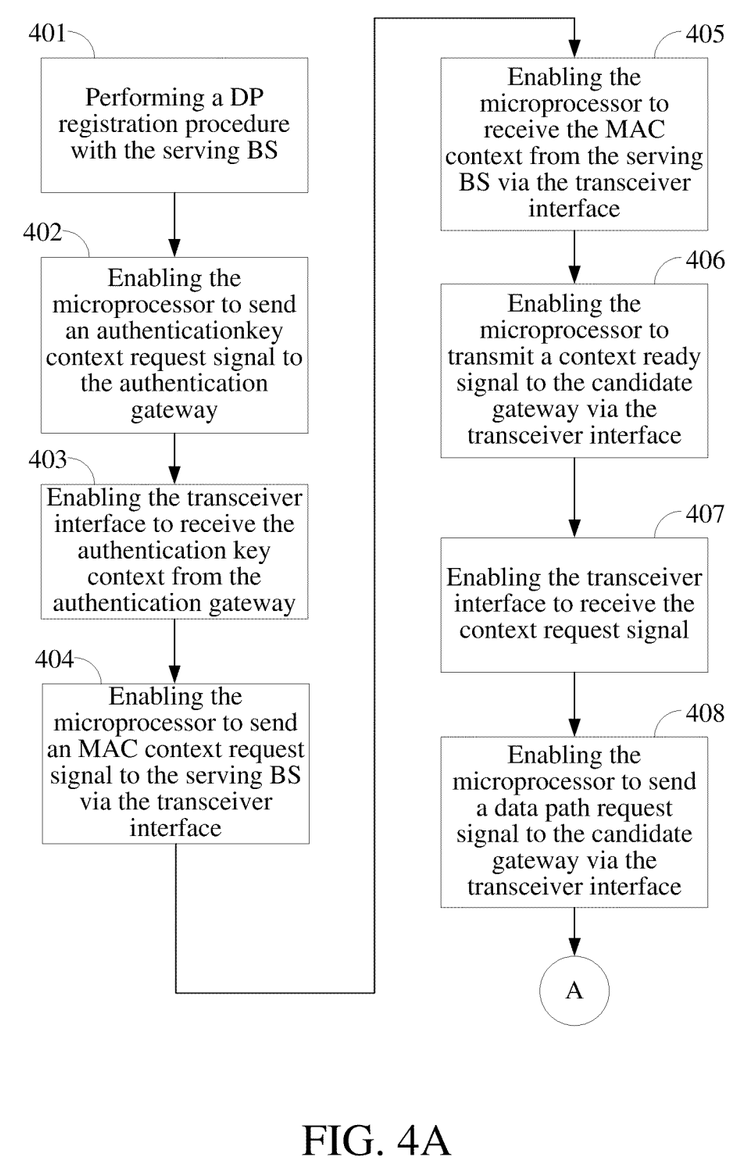
FIGS. 4A-4B is the flowcharts of a second embodiment of the present invention.
Figure 4B:
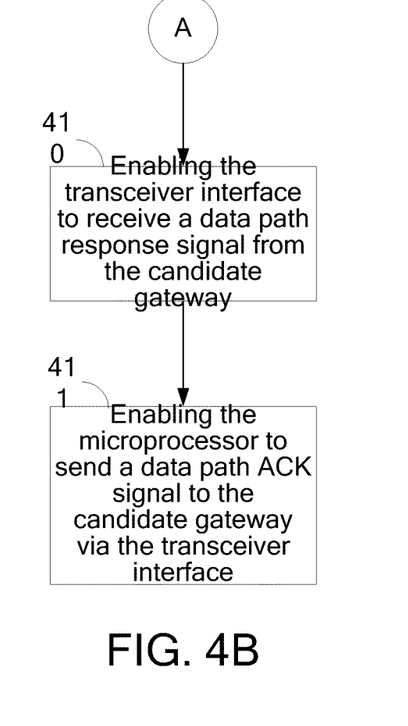

A second example embodiment of the present invention is shown in FIG. 4A-4B, which show flowcharts of a communication method for an anchor gateway as described in the first example embodiment. The anchor gateway here is for use in a WiMAX network. The WiMAX network comprises an authentication gateway, a serving BS and a candidate gateway. The serving BS is configured to, after an MS has entered the WiMAX network, transmit a connection signal comprising an ID code of the MS. The anchor gateway comprises a transceiver interface and a microprocessor electrically connected to the transceiver interface.

The communication method of the second example embodiment comprises the steps as follows. Referring to FIG. 4A, step 401 is firstly executed to perform a first DP registration procedure of the MS with the serving BS. After that, the anchor gateway thus learns the ID code of the MS. In order to obtain the authentication key context related to the MS, step 402 is then executed to enable the microprocessor to transmit an authentication key context request signal comprising the ID code of the MS to the authentication gateway via the transceiver interface according to the DP registration signal. After receiving the authentication key context request signal, the authentication gateway will retrieve the authentication key context related to the MS and the candidate BSs according to the ID code of the MS and transmit it to the anchor gateway.

Afterwards, after the authentication key context request signal is transmitted, step 403 is executed to enable the transceiver interface to receive the authentication key context from the authentication gateway. Thus, the authentication key context related to the MS is obtained by the anchor gateway.

On the other hand, in order to obtain the MAC context related to the MS, step 404 is executed to enable the microprocessor to transmit an MAC context request signal comprising the ID code of the MS to the serving BS via the transceiver interface according to the DP registration signal. After receiving the MAC context request signal, the serving BS will retrieve the MAC context related to the MS according to the ID code of the MS and transmit it to the anchor gateway. Next, step 405 is executed to, after the MAC context request signal is sent, enable the transceiver interface to receive the MAC context from the serving BS. Thus, the MAC context related to the MS is obtained by the anchor gateway.

After the MAC context and the authentication key context are obtained, step 406 is executed to enable the microprocessor to transmit a context ready signal comprising the ID code of the MS to the candidate gateway via the transceiver interface so that, when the MS is to be handed over to the candidate gateway itself, the candidate gateway can retrieve the authentication key context and the MAC context from the anchor gateway according to the context ready signal.

If the MS is to be handed over to a candidate BS of the candidate gateway, the candidate gateway, which may be viewed as a target gateway herein, will transmit a context request signal according to the handover action. Next, step 407 is executed to enable the transceiver interface to receive the context request signal, and step 408 is executed to enable the microprocessor to transmit a data path request signal comprising the ID of the MS, the authentication key context and the MAC context to the target gateway via the transceiver interface. After receiving the data path request signal, the target gateway returns a data path response signal to the anchor gateway to inform the anchor gateway that the data path request signal has been received.

Subsequently, after the data path request signal is transmitted, step 409 is executed to enable the transceiver interface to receive a data path response signal from the target gateway. Finally, after the data path response signal is received, step 410 is executed to enable the microprocessor to transmit a data path ACK signal to the target gateway via the transceiver interface to complete the data path registration procedure. In general, steps 408, 409 and 410 may be viewed as a process in which the microprocessor performs a data path registration procedure with the target gateway according to the context request signal so that the authentication key context and the MAC context can be obtained by the candidate gateway.

In addition to the aforesaid steps, the second example embodiment can also execute all the operations and functions set forth in the first embodiment. How the second embodiment executes these operations and functions will be readily appreciated by those of ordinary skill in the art based on the explanation of the first embodiment, and thus will not be further described herein.

Furthermore, the communication method described in the second example embodiment may be implemented by a program stored in a tangible machine-readable medium. When the program is loaded into an anchor gateway via a computer and a plurality of codes contained therein is executed, the communication method of the second embodiment can be accomplished. The tangible machine-readable medium may be a read only memory (ROM), a flash memory, a floppy disk, a hard disk, a compact disk, a mobile disk, a magnetic tape, a database accessible to networks, or any other storage media with the same function and well known to those skilled in the art.

The anchor gateway according to certain embodiments of the present invention is able to, according to the ID code of the MS, request the authentication gateway and the serving BS to respectively provide authentication key context and MAC context. Then, when the MS transmits a handover request to a target BS, the target BS may acquire the authentication key context and the MAC context from the anchor gateway in one go, thereby reducing the handover latency. Thereby, the drawback of the prior art is addressed.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An anchor gateway for use in a WiMAX network, the WiMAX network comprising an authentication gateway, a serving gateway and a serving base station (BS), the serving BS being configured to proceed a first data path (DP) registration procedure with the anchor gateway via the serving gateway and transmit a DP registration signal, comprising an identification (ID) code of a mobile station (MS), of the MS corresponding to the first DP registration procedure, the anchor gateway comprising:
   a transceiver interface, being configured to receive the DP registration signal; and
   a microprocessor, being electrically connected to the transceiver interface and configured to:
      transmit an authentication key context request signal comprising the ID code of the MS to the authentication gateway via the transceiver interface according to the DP registration signal; and
      transmit a medium access control (MAC) context request signal comprising the ID code of the MS to the serving BS according to the DP registration signal;
   wherein the authentication gateway is configured to transmit authentication key context according to the ID code of the MS and the ID code of the candidate BS, the serving BS is configured to transmit an MAC context according to the ID code of the MS, and the transceiver interface is further configured to receive the authentication key context and the MAC context.

2. The anchor gateway as claimed in claim 1, wherein after receiving the authentication key context, the microprocessor is further configured to transmit an acknowledgement (ACK) signal to the authentication gateway.

3. The anchor gateway as claimed in claim 1, wherein the WiMAX network further comprises a candidate gateway, and after receiving the authentication key context and the MAC context, the microprocessor is further configured to transmit a context ready signal comprising the ID code of the MS to the candidate gateway via the transceiver interface so that the candidate gateway may retrieve the authentication key context and the MAC context from the anchor gateway according to the context ready signal when the MS is to be handed over to the candidate gateway.

4. The anchor gateway as claimed in claim 3, wherein the candidate gateway is further configured to transmit a context request signal, the transceiver interface is further configured to receive the context request signal, and the microprocessor is further configured to perform a second data path registration procedure with the candidate gateway according to the context request signal so that the candidate gateway may obtain the authentication key context and the MAC context.

5. The anchor gateway as claimed in claim 4, wherein after receiving the context request signal, the microprocessor is further configured to transmit a data path request signal comprising the authentication key context and the MAC context to the candidate gateway via the transceiver interface, and the transceiver interface is further configured to, after the data path request signal is transmitted, receive a data path response signal from the candidate gateway, and the microprocessor is further configured to, after receiving the data path response signal, transmit a data path ACK signal to the candidate gateway via the transceiver interface to complete the second data path registration procedure.

6. A communication method for use in an anchor gateway, the anchor gateway being for use in a WiMAX network, the WiMAX network comprising an authentication gateway, a serving gateway and a serving BS, the serving BS is configured to proceed a first data path (DP) registration procedure with the anchor gateway via the serving gateway and transmit a DP registration signal, comprising an identification (ID) code of a mobile station (MS), of the MS corresponding to the first DP registration procedure, the anchor gateway comprises a transceiver interface and a microprocessor electrically connected to the transceiver interface, the communication method comprising the steps of:
   enabling the transceiver interface to receive the DP registration signal;
   enabling the microprocessor to transmit an authentication key context request signal comprising the ID code of the MS to the authentication gateway via the transceiver interface according to the DP registration signal;
   enabling the microprocessor to transmit an MAC context request signal comprising the ID code of the MS to the serving BS via the transceiver interface according to the DP registration signal; and
   enabling the transceiver interface to, after the authentication key context request signal and the MAC context request signal are transmitted, receive authentication key context from the authentication gateway and MAC context from the serving BS.

7. The communication method as claimed in claim 6, further comprising the step of enabling the microprocessor to transmit an ACK signal to the authentication gateway after receiving the authentication key context.

8. The communication method as claimed in claim 6, wherein the WiMAX network further comprises a candidate gateway, and the communication method further comprises a step of enabling the microprocessor to transmit a context ready signal comprising the ID code of the MS to the candidate gateway via the transceiver interface after receiving the authentication key context and the MAC context so that the candidate gateway can retrieve the authentication key context and the MAC context from the anchor gateway according to the context ready signal when the MS is to be handed over to the candidate gateway.

9. The communication method as claimed in claim 8, wherein the candidate gateway is further configured to transmit a context request signal, the communication method further comprising the steps of:
   (a) enabling the transceiver interface to receive the context request signal; and
   (b) enabling the microprocessor to perform a second DP registration procedure with the candidate gateway according to the context request signal so that the candidate gateway may obtain the authentication key context and the MAC context.

10. The communication method as claimed in claim 9, wherein the step (b) comprises the steps of:
   (b1) enabling the microprocessor to transmit a data path request signal comprising the authentication key context and the MAC context to the candidate gateway via the transceiver interface;
   (b2) enabling the transceiver interface to, after the data path request signal is transmitted, receive a data path response signal from the candidate gateway; and
   (b3) enabling the microprocessor to, after receiving the data path response signal, transmit a data path ACK signal to the candidate gateway via the transceiver interface to complete the second DP registration procedure.

11. A non-transitory machine-readable medium, storing a program of a communication method for an anchor gateway, the anchor gateway being for use in a WiMAX network, the WiMAX network comprising an authentication gateway, a serving gateway and a serving BS, the serving BS is configured to proceed a first data path (DP) registration procedure with the anchor gateway via the serving gateway and transmit a DP registration signal, comprising an identification (ID) code of a mobile station (MS), of the MS corresponding to the first DP registration procedure, the anchor gateway comprising a transceiver interface and a microprocessor electrically connected to the transceiver interface, the program being loaded into the anchor gateway and then executes:
- a code A for enabling the transceiver interface to receive the DP registration signal;
- a code B for enabling the microprocessor to transmit an authentication key context request signal comprising the ID code of the MS to the authentication gateway via the transceiver interface according to the DP registration signal;
- a code C for enabling the microprocessor to transmit an MAC context request signal comprising the ID code of the MS to the serving BS via the transceiver interface according to the DP registration signal; and
- a code D for enabling the transceiver interface to, after transmitting the authentication key context request signal and the MAC context request signal, receive authentication key context from the authentication gateway and MAC context from the serving BS.

12. The non-transitory machine-readable medium as claimed in claim 11, wherein the program further executes a code E for enabling the microprocessor to transmit an ACK signal to the authentication gateway after receiving the authentication key context.

13. The non-transitory machine-readable medium as claimed in claim 11, wherein the WiMAX network further comprises a candidate gateway, and the program further executes a code F for enabling the microprocessor to transmit a context ready signal comprising the ID code of the MS to the candidate gateway via the transceiver interface after receiving the authentication key context and the MAC context so that the candidate gateway can retrieve the authentication key context and the MAC context from the anchor gateway according to the context ready signal when the MS is to be handed over to the candidate gateway.

14. The non-transitory machine-readable medium as claimed in claim 13, wherein the candidate gateway is further configured to transmit a context request signal, and the program further executes:
- a code G for enabling the transceiver interface to receive the context request signal; and
- a code H for enabling the microprocessor to perform a second data path registration procedure with the candidate gateway according to the context request signal so that the candidate gateway can obtain the authentication key context and the MAC context.

15. The non-transitory machine-readable medium as claimed in claim 14, wherein the code H comprises the following codes:
- a code H1 for enabling the microprocessor to transmit a data path request signal comprising the authentication key context and the MAC context to the candidate gateway via the transceiver interface;
- a code H2 for enabling the transceiver interface to receive a data path response signal from the candidate gateway after transmitting the data path request signal; and
- a code H3 for enabling the microprocessor to transmit a data path ACK signal to the candidate gateway via the transceiver interface after receiving the data path response signal to complete the second data path registration procedure.

* * * * *